Jan. 16, 1968   B. R. CALDEBÄCK   3,363,444
ROLLING MILL
Filed Dec. 18, 1963   3 Sheets-Sheet 1
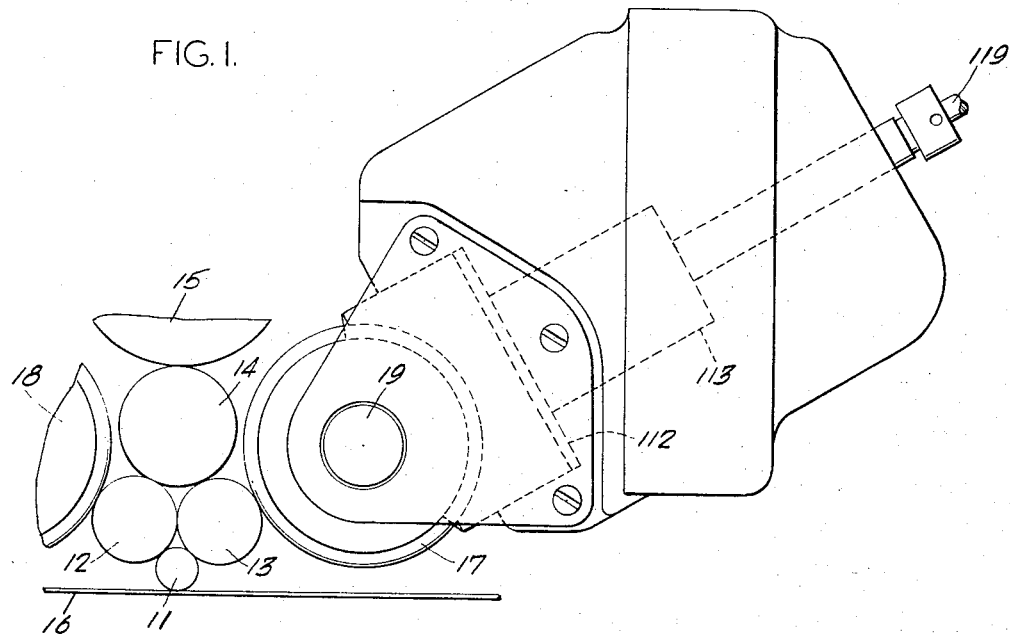
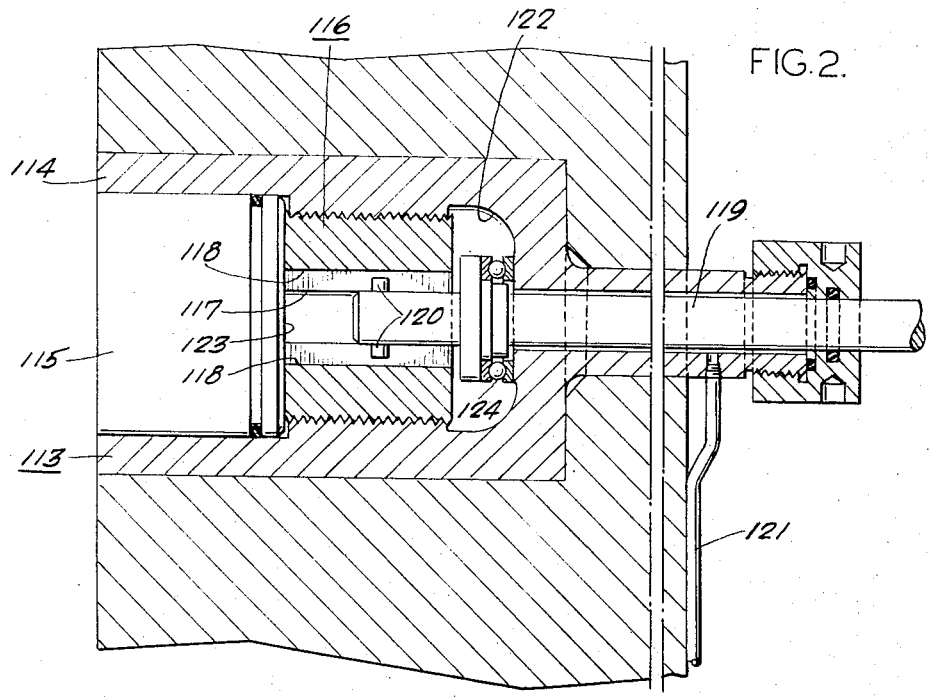
INVENTOR:
BERNT RUNE CALDEBÄCK
Howson & Howson
ATTYS.

Jan. 16, 1968    B. R. CALDEBÄCK    3,363,444
ROLLING MILL
Filed Dec. 18, 1963    3 Sheets-Sheet 3

INVENTOR:
BERNT RUNE CALDEBÄCK
Howson & Howson
ATTYS.

United States Patent Office 3,363,444
Patented Jan. 16, 1968

3,363,444
ROLLING MILL
Bernt Rune Caldebäck, Goteborg, Sweden, assignor to Aktiebolaget Svenska Kullagerfabriken, Goteborg, Sweden, a corporation of Sweden
Filed Dec. 18, 1963, Ser. No. 331,564
Claims priority, application Sweden, Dec. 22, 1962, 13,949/62
6 Claims. (Cl. 72—243)

Various kinds of machines are provided with mechanical means by which a certain position of a machine part is maintained or adjusted. When these locking means are so heavily loaded that dry friction occurs between engaging surfaces which are movable relative each other for adjusting the locking means, the force which is required for this adjustment will be very considerable. Further, there will be a risk that the surfaces will seize. In some cases such locking means have therefore been provided with means for leading oil between the engaging surfaces. In order to avoid rupture of the oil film the oil is under high pressure. This decreases the friction between the surfaces but does not avoid the heavy load on the locking means during adjustment thereof.

The present invention relates to means for maintaining a variable load from a piston movable in a cylinder to which is connected a source of hydraulic pressure and is characterized mainly by adjustable locking means acting on the end face of the piston, such as a threaded body, a wedge or the like, disposed within the cylinder or an extension thereof for fixing the position of the piston substantially as determined by the pressure medium.

The structural details and arrangement of the present invention and the various features thereof are hereinafter more fully set forth with reference to the accompanying drawing, wherein:

FIG. 1 is a fragmentary side elevational view of a portion of a rolling mill viewed in the axial direction of the rolls;

FIG. 2 is an enlarged sectional view of the adjusting mechanism for the supporting rolls of the rolling mill shown in FIG. 1;

Figure 3:
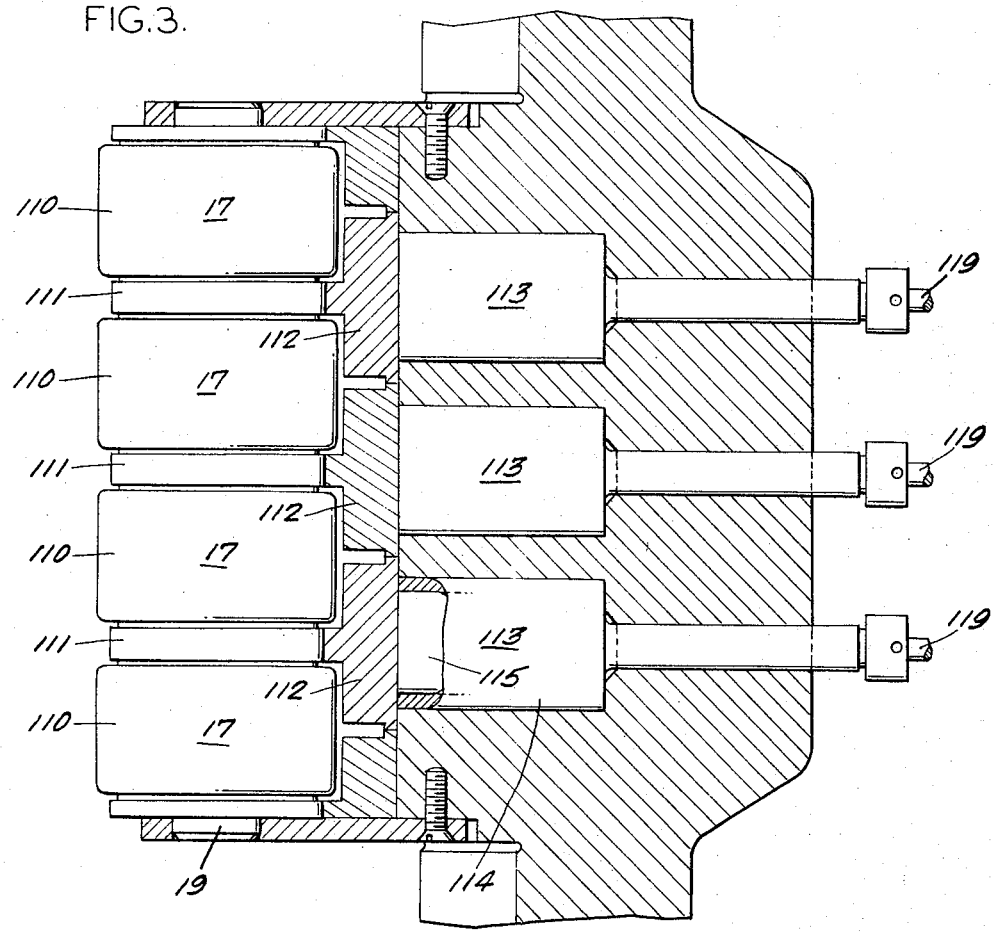
FIG. 3 is an enlarged fragmentary sectional view of the supporting rolls.

As mentioned above the invention is applicable in a great variety of cases. FIGS. 1 to 5 show the invention as applied in a strip rolling mill. FIGS. 1, 2 and 3 illustrate a form of the invention in which the locking means consist of a screw while in FIGS. 4 and 5 they consist of a wedge.

In FIG. 1 which shows a side view of a portion of the upper half of a rolling mill, the numeral 11 indicates a working roll and 12, 13 and 14 are intermediate supporting rolls. A roller 15 (of which a portion only is indicated) is displaceable in a direction perpendicular to the direction of movement of the strip 16 being rolled. In order to give the working rolls a certain amount of crowning, which is necessary to make the strip of equal thickness across its whole width, the intermediate rolls 12, 13 are supported by symmetrically located, subdivided supporting rolls 17 and 18, only a portion of the latter being indicated. The supporting roll 17 comprises four short rollers 110 (see FIG. 3) mounted on a shaft 19. Circular disks 111 are located between these rolls there being saddle-shapped pressure members 112 engaging the disks while subjected to a load from loading devices 113. By these means the rollers 110 can be adjusted independent of each other to provide a crowning effect.

FIG. 2 shows on a larger scale a loading device of this kind which consists of a cylinder 114 in which is a movable piston 115 one end of which is supported against the saddle-shaped pressure member 112, see FIGS. 1 and 3, and the other end of which engages a screw 116. The centre of the screw is provided with a bore 117 having two diametrically opposed axially extending grooves 118. A rod 119 is located within the bore 117 the end thereof being provided with radially projecting pins 120 fitting into the grooves 118. When the rod 119 is turned, the screw 116 will thus also be turned. Oil under pressure is led through a conduit 121 to a chamber 122 at the end of the screw and further through the grooves 118 to the end face 123 of the piston 115 facing the screw 116.

The device functions as follows: When the screw 116 is to be turned in either direction pressure medium is introduced through the conduit 121 and subjects the surface 123 of the piston to a force which is greater than the force with which the piston normally contacts the screw 116. The latter is therefore freed from all load since the hydraulic pressure on the respective ends of the screw balance each other. The screw can then easily be turned by hand through the rod 119. Since the hydraulic pressure exerts an axial force on the end of the rod a thrust bearing 124 is provided to take up this load. When the screw has been turned the desired amount the pressure oil is permitted to escape and the roll pressure of the rolling mill is transferred to the piston 115 and taken up by the screw 116.

Figure 4:
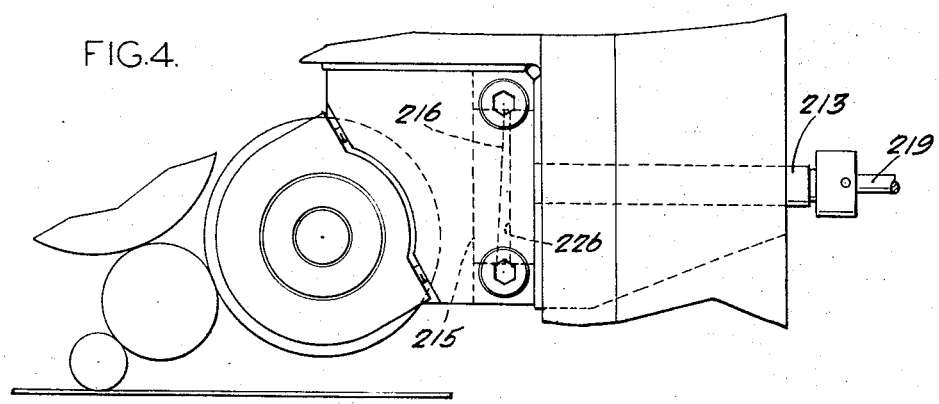
FIG. 4 is a fragmentary side elevational view of another embodiment of adjusting means for the supporting rolls of a rolling mill.
Figure 5:
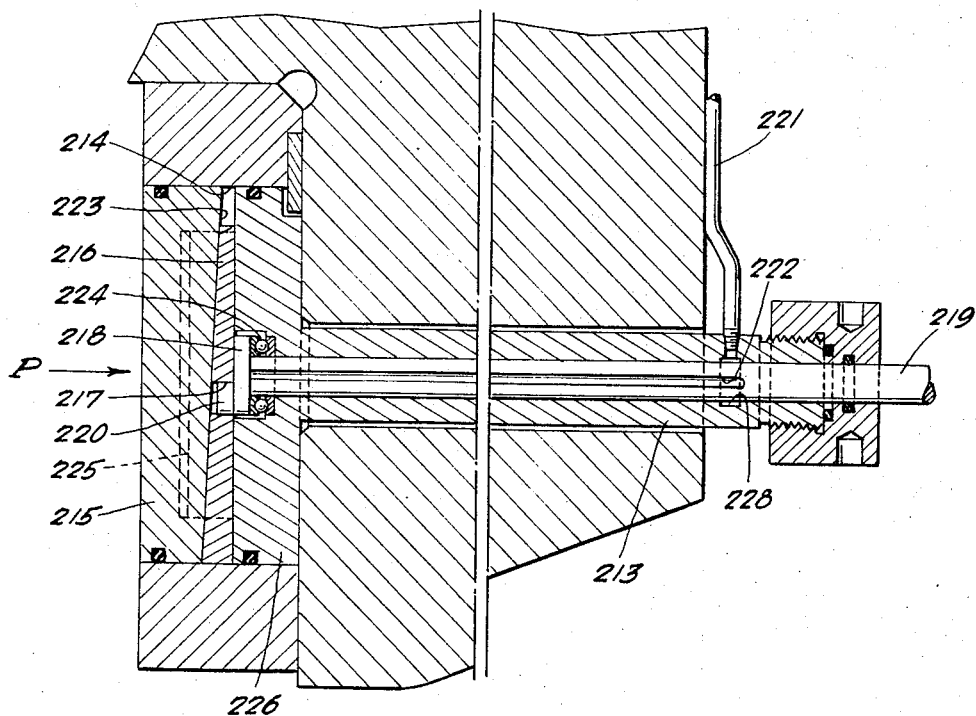
FIG. 5 is an enlarged sectional view of the second embodiment of the adjusting means.
Figure 6:
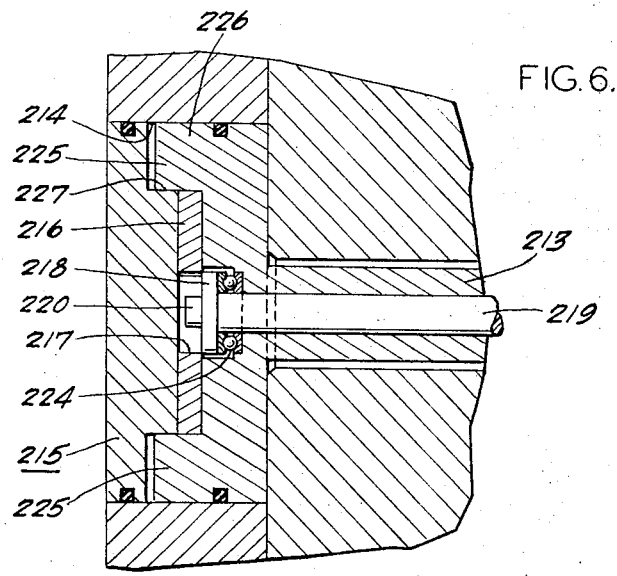
FIG. 6 is an enlarged sectional view of the adjusting means shown in FIG. 5 taken transversely thereof.

FIGS. 4, 5 and 6 show another form of the invention also applied to a rolling mill. Since its function is similar to that shown in FIGS. 1, 2 and 3, the following description relates only to the locking means.

The position of a piston 215 in a cylinder 214 is fixed by the action of a wedge 216. The wedge is provided with a centrally located elongated hole 217 into which is inserted a crank pin 220 which is eccentrically fixed to a disc 218 connected to the end of a rod 219 which is rotatable in an extended portion 213 of a fixed piston 226. The hole 217 is at least as long as the eccentricity of the pin plus its diameter. During its movement the wedge is guided between two guides 225 (see FIG. 6) on the piston 226. The guides 225 at the same time engage surfaces 227 on a movable piston 215 which is thus prevented from turning. A groove 222 is provided axially along the rod 219 and leads oil to the surface 223 of the piston 215 facing the wedge. The oil is led from a conduit 221 through an annular member 228 to the groove 222. The thrust force acting on the end of the rod is taken up by a thrust bearing 224. The piston 215 is subjected to a force P from the roll pressure of the rolling mill. To enable the wedge 216 to be displaced it is necessary to balance the force P and thus relieve the wedge by subjecting the surface 223 to a sufficiently high hydraulic pressure transmitted through the conduit 221, the annular chamber 228 and the groove 222. FIG. 5 shows the wedge in lower position. When the rod 219 is turned in either direction the wedge is lifted by the crank pin 220. The angle to which the rod is turned is determined by the amount of the desired adjustment, i.e. the desired amount of displacement of the piston 215. The hydraulic pressure may then be released.

I claim:

1. A device for a rolling mill comprising a cylindrical chamber, a piston mounted in said cylindrical chamber, an adjustable abutment member mounted in said cylindrical chamber which is selectively movable axially thereof and against which one face of the piston normally abuts, and means including a fluid pressure supply communicating with said cylindrical chamber and said one face of the piston, whereby supply of fluid under pressure to said cylindrical chamber effects displacement of said piston in a direction away from said adjustable abutment member to permit axial adjustment thereof in the cylindrical chamber.

2. In a rolling mill including at least one working roll adapted to engage a workpiece, intermediate rolls backing up the working roll, and at least one supporting roll engaging the intermediate rolls, said supporting roll comprising a plurality of rollers mounted on a shaft, a disc mounted on the shaft intermediate the rollers and means for selectively adjusting the rollers relative to one another to provide a crowning effect, said adjusting means including a pressure member engaging the discs, a piston normally engaging in said pressure member, a cylindrical chamber within which said piston is mounted, an adjustable abutment member mounted for movement axially of said cylindrical chamber against which one face of said piston normally abuts and fluid pressure supply means communicating with said one piston face engaging said abutment member and operable to displace said piston member away from said abutment member to permit axial adjustment thereof in said cylindrical chamber.

3. In a rolling mill as claimed in claim 2, wherein said abutment member comprises a sleeve having external threads cooperating with threads in the cylindrical chamber and means for rotating the abutment member to effect axial movement thereof relative to the cylinder.

4. In a rolling mill as claimed in claim 3 wherein the sleeve is a hollow member and wherein the means for rotating the sleeve comprises a rod rotatably mounted in said cylindrical chamber axially thereof having radially projecting pins at one end engageable in grooves in the internal surface of the sleeve and including a thrust bearing assembly internally of the cylindrical chamber for permitting rotation of said rod.

5. In a rolling mill as claimed in claim 2 wherein said abutment member comprises a wedge having a tapered inclined surface which engages an inclined surface on the piston and actuating means for moving the wedge relative to the inclined surface on the piston whereby the axial position of the piston in the cylinder may be adjusted by moving the wedge.

6. In a rolling mill as claimed in claim 5 wherein the wedge is provided with an elongated opening and wherein the actuating means comprises a disc which mounts an eccentrically disposed crank pin and which is connected to the end of a rod rotatable in an extended portion of the piston, the opening being at least as long as the eccentricity of the pin plus its diameter and including a pair of spaced apart guides on the face of the piston to guide the wedge.

References Cited
UNITED STATES PATENTS

| | | | |
|---|---|---|---|
| 163,606 | 5/1875 | Peper | 92—13 |
| 794,882 | 7/1905 | Pagenhart | 92—13 |
| 1,066,483 | 7/1913 | Fournia | 92—13 |
| 2,770,984 | 11/1956 | Loecy | 92—13 |
| 2,918,040 | 12/1959 | Lieser | 92—13 |

CHARLES W. LANHAM, *Primary Examiner.*

H. D. HOINKES, *Assistant Examiner.*